(12) United States Patent
Kurokawa et al.

(10) Patent No.: US 10,252,654 B2
(45) Date of Patent: Apr. 9, 2019

(54) SEAT BACK FRAME

(71) Applicant: TOYOTA BOSHOKU KABUSHIKI KAISHA, Aichi-ken (JP)

(72) Inventors: Kimiyasu Kurokawa, Aichi-ken (JP); Yoshihiro Motoi, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 15/596,069

(22) Filed: May 16, 2017

(65) Prior Publication Data

US 2017/0334329 A1   Nov. 23, 2017

(30) Foreign Application Priority Data

May 19, 2016   (JP) ................. 2016-100225

(51) Int. Cl.
*B60N 2/68*  (2006.01)

(52) U.S. Cl.
CPC ............... *B60N 2/682* (2013.01); *B60N 2/68* (2013.01)

(58) Field of Classification Search
CPC .................................. B60N 2/68; B60N 2/682
USPC ........................................ 297/452.18, 452.2
See application file for complete search history.

(56) References Cited

U.S. PATENT DOCUMENTS

| 8,485,606 | B2 * | 7/2013 | Geisler | .................. | B23K 26/10 |
| | | | | | 297/216.13 |
| 2007/0040362 | A1 * | 2/2007 | Saberan | .................. | B60N 2/68 |
| | | | | | 280/730.2 |
| 2010/0276978 | A1 * | 11/2010 | Furuta | .................. | B60N 2/4808 |
| | | | | | 297/410 |
| 2012/0261963 | A1 * | 10/2012 | Heyer | .................. | B60N 2/0232 |
| | | | | | 297/313 |
| 2013/0221725 | A1 | 8/2013 | Yamada et al. | | |
| 2013/0341990 | A1 * | 12/2013 | Muck | .................. | B60N 2/68 |
| | | | | | 297/452.18 |

(Continued)

FOREIGN PATENT DOCUMENTS

| JP | 2002-337585 | 11/2002 |
| JP | A2012096759 | 5/2012 |

(Continued)

OTHER PUBLICATIONS

JP Information offer in counterpart JP application No. 2016-100225, dated Nov. 26, 2018 (with English-language translation).

*Primary Examiner* — Mark R Wendell
(74) *Attorney, Agent, or Firm* — Greenblum & Bernstein, P.L.C.

(57) ABSTRACT

A seat back frame including an upper frame forming an upper framework of a seat back and extending in a seat width direction, and a side frame forming a side framework of the seat back and extending in a seat height direction, wherein an upper end of the side frame extends in the seat height direction up to a portion of the upper frame extending in the seat width direction, and wherein the side frame includes a general surface portion which is in contact with the upper fame from below with its surface facing the seat width direction, and a flange portion which protrudes from the general surface portion with its surface facing a seat front and rear direction, is in contact with the upper frame from at least one of the front and rear sides, and is welded to the upper frame.

19 Claims, 7 Drawing Sheets

(56) References Cited

U.S. PATENT DOCUMENTS

| | | | | |
|---|---|---|---|---|
| 2014/0312664 | A1* | 10/2014 | Tanabe | B60R 21/207 297/216.13 |
| 2014/0375099 | A1* | 12/2014 | Kitou | B60N 2/682 297/391 |
| 2015/0035339 | A1 | 2/2015 | Endou et al. | |
| 2015/0076880 | A1* | 3/2015 | Kuhley | B60N 2/02 297/313 |
| 2015/0091356 | A1* | 4/2015 | Ozaki | B60N 2/803 297/391 |
| 2015/0202998 | A1* | 7/2015 | Komatsubara | B60N 2/68 297/216.1 |
| 2015/0210196 | A1* | 7/2015 | Yamamoto | B60N 2/682 297/452.18 |
| 2016/0039323 | A1* | 2/2016 | Hoshi | B60N 2/72 297/452.18 |
| 2017/0282313 | A1* | 10/2017 | Nakano | B23P 21/002 |
| 2018/0065530 | A1* | 3/2018 | Hoshi | B60N 2/42709 |

FOREIGN PATENT DOCUMENTS

| | | |
|---|---|---|
| JP | 2015-29635 | 2/2015 |
| JP | A2016100225 | 5/2016 |
| JP | A2017140919 | 8/2017 |
| JP | A2017171098 | 9/2017 |

\* cited by examiner

SEAT BACK FRAME

CROSS-REFERENCE TO RELATED APPLICATIONS

This application claims priority from Japanese Patent Application No. 2016-100225 filed on May 19, 2016, the entire contents of which are incorporated herein by reference.

TECHNICAL FIELD

The disclosure relates to a seat back frame. More particularly, the disclosure relates to a seat back frame forming a framework along an outer peripheral portion of a seat back.

BACKGROUND

As a seat back frame of a vehicle seat, there is known a seat back frame which is assembled in a substantially inverted U shape in a front view along an outer peripheral portion of a seat back (JP-A-2002-337585). Specifically, the seat back frame is assembled in a substantially inverted U shape in a front view by a pair of left and right side frames made of vertically elongated steel plate material and an upper pipe made of a circular steel pipe and bridged between upper end portions of the respective side frames. The upper pipe is configured to be bent in a substantially inverted U shape in a front view. Bent end portions on both sides of the upper pipe are fitted, from the inside, to fitting portions which are formed at the upper end portions of the respective side frames and are narrowed into a semicircular shape and are welded to the fitting portions.

In the above-described technology, the end portions of the upper pipe bent downward are in contact with the upper end portions of the respective side frames from the lateral side. Therefore, a lap margin in a height direction between the upper pipe and respective the side frames is large, and therefore, the weight is increased.

SUMMARY

An aspect of the disclosure has been made to solve the above problems and an object to be solved by the aspect of the disclosure is to reduce the weight of a joint structure between an upper frame and side frames of a seat back frame.

According to an aspect of the disclosure, there is provided a seat back frame forming a framework along an outer peripheral portion of a seat back, the seat back frame including: an upper frame forming an upper framework of the seat back and extending in a seat width direction; and a side frame forming a side framework of the seat back and extending in a seat height direction, wherein an upper end of the side frame extends in the seat height direction up to a portion of the upper frame extending in the seat width direction, and wherein the side frame includes: a general surface portion which is in contact with the upper fame from below with its surface facing the seat width direction, and a flange portion which protrudes from the general surface portion with its surface facing a seat front and rear direction, is in contact with the upper frame from at least one of the front and rear sides, and is welded to the upper frame.

Accordingly, since the side frame is in contact with the upper frame from below and is welded to the upper frame, the portions of the side frame and the upper frame, which extend in the same direction, do not overlap with each other. Therefore, the side frame and the upper frame can be assembled to each other with less overlap mount. Furthermore, the welding length with respect to the upper frame can be made longer in the seat width direction by the flange portion. With these configurations, it is possible to reduce the weight of a joint structure between the upper frame and the side frame.

DETAILED DESCRIPTION

Figure 1:
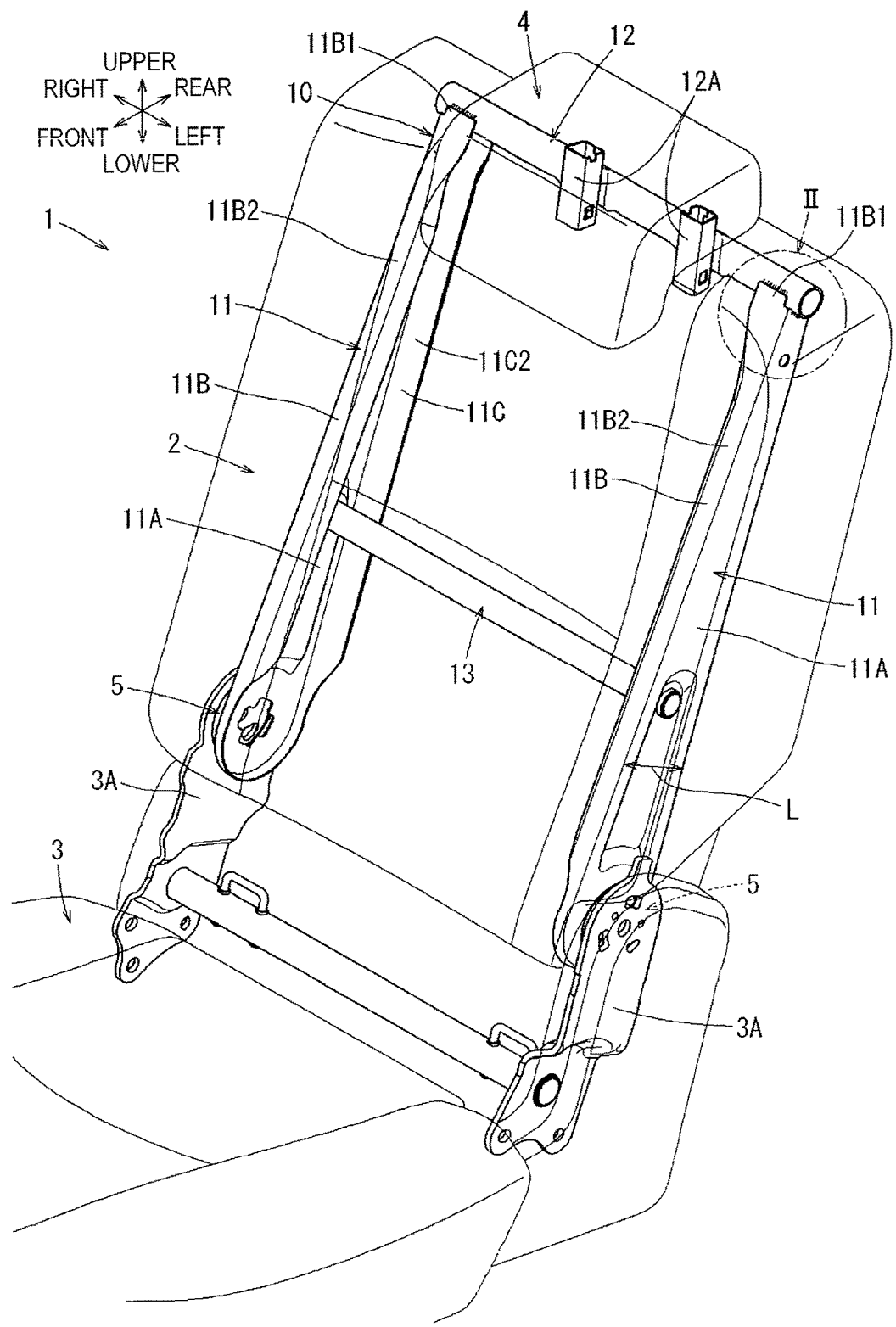
FIG. 1 is a perspective view showing a schematic configuration of a seat back frame according to a first embodiment.
Figure 2:
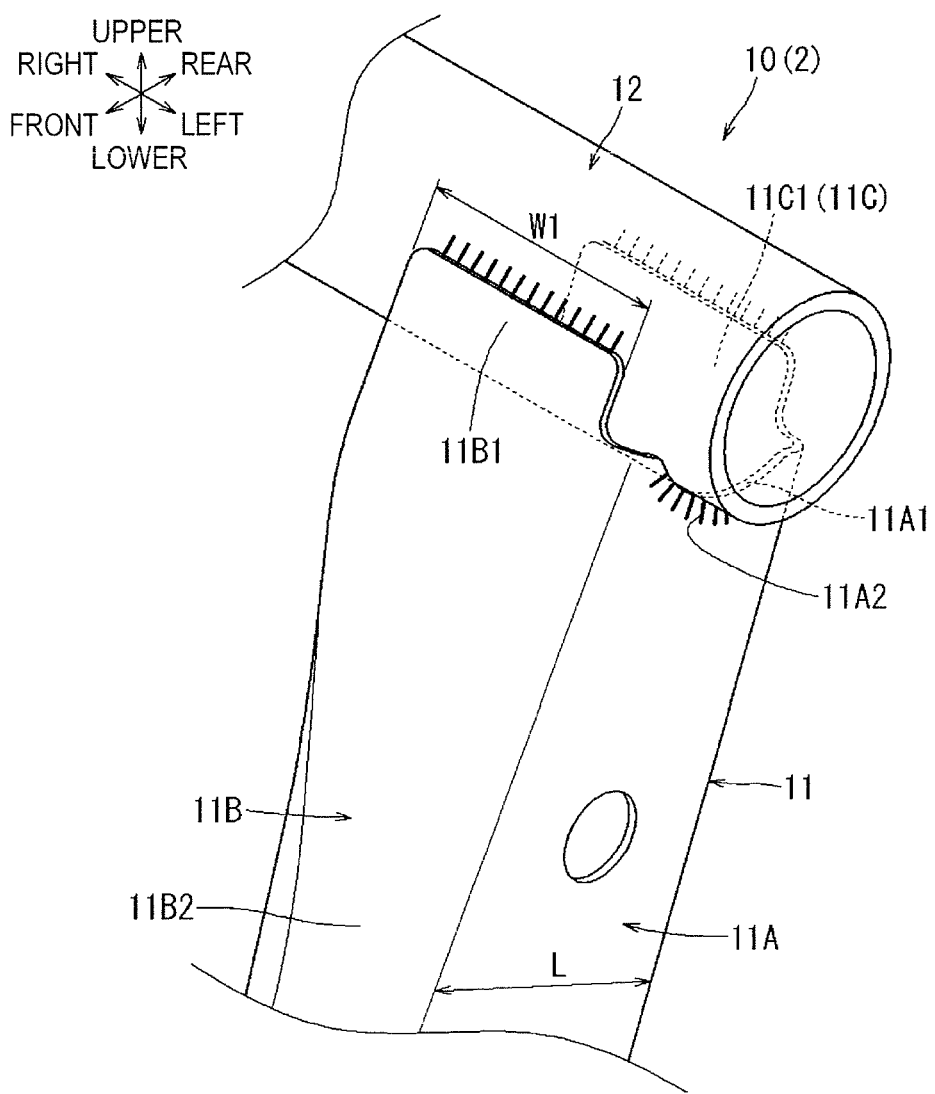
FIG. 2 is an enlarged view of the part II in FIG. 1.

Hereinafter, embodiments for carrying out the disclosure will be described with reference to the drawings.

First Embodiment

First of all, a configuration of a seat 1 (vehicle seat) including a seat back frame (hereinafter, referred to as a "back frame") 10 according to a first embodiment will be described with reference to FIGS. 1 to 7. First, a basic structure of the seat 1 will be described with reference to FIG. 1. Meanwhile, in the following description, in the case of describing various directions with the word "seat" added, such as the "seat width direction" and the "seat height direction," the various directions are assumed to be indicated with reference to the seat 1. The seat 1 of the present embodiment is configured as a single-seat on the rear side of an automobile. The seat 1 is configured to include a seat back 2 serving as a backrest portion of a seated occupant, a seat cushion 3 serving as a seating portion of the seated occupant, and a headrest 4 serving as a head support portion of the seated occupant.

The above-described seat back 2 is connected to a rear end portion of the seat cushion 3 in such a state that a backrest angle can be adjusted via a pair of left and right recliners 5. Specifically, each of the above-described recliners 5 is normally held in a locked state in which the backrest angle of the seat back 2 is fixed. Further, each recliner 5 is configured to be switched to a state in which each locked state is released concurrently and thus the backrest angle of the seat back 2 can be adjusted in the seat front and rear direction, by an operation of pulling up a reclining lever provided at an outer side portion in a vehicle width direction of the seat cushion 3 facing an entrance door side (not shown). Further, as the operation of the reclining lever (not shown) is returned, each recliner 5 is biased and thus returned again to the locked state in which the backrest angle of the seat back 2 is fixed.

Here, a detailed description of the specific configuration of each recliner 5 described above will be omitted since its basic configuration is the same as the known configuration disclosed in the literatures such as JP-A-2015-029635. The headrest 4 is in a state of being inserted and mounted to an upper surface portion of the seat back 2 from above.

The above-described seat back 2 is configured such that a metallic back frame 10 forming a main framework inside the seat back 2 is assembled in a substantially inverted U shape in a front view along an outer peripheral shape of the seat back 2. Specifically, the above-described back frame 10 is assembled in a substantially inverted U shape in a front view by a pair of left and right side frames 11 made of vertically elongated steel plate material and an upper pipe 12 made of a circular steel pipe. The upper pipe 12 is integrally bridged between upper end portions of the respective side frames 11 and extends in a straight form in the seat width direction. Rectangular tubular support brackets 12A to which the above-described headrest 4 is fitted are integrally welded and coupled to two front positions at the center of the above-described upper pipe 12 in the seat width direction. Further, between intermediate portions of the respective side frames 11 in the seat height direction, a reinforcing pipe 13 made of a circular steel pipe is inserted in a state of penetrating in the seat width direction and is firmly and integrally coupled by welding. Here, the upper pipe 12 corresponds to the "upper frame" of the disclosure.

Figure 3:
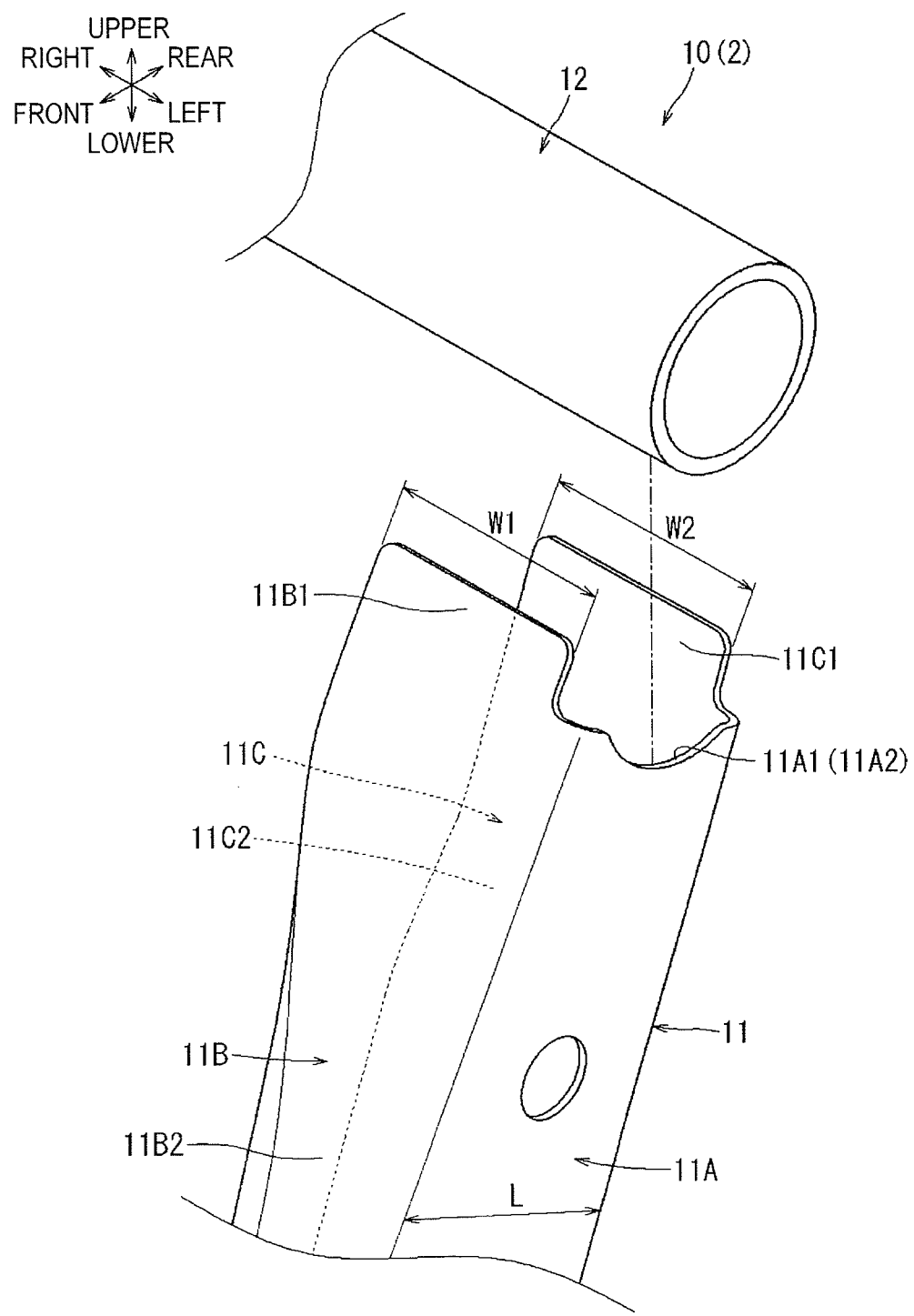
FIG. 3 is an exploded perspective view of FIG. 2.

Each of the side frames 11 described above is respectively formed to have a height that forms the entire side framework of the seat back 2 by a single press-formed steel plate material. Specifically, as shown in FIGS. 1 and 3, each side frame 11 has a vertically elongated general surface portion 11A with its surface facing the seat width direction, a front flange portion 11B bent from a front edge portion of the general surface portion 11A so as to protrude inward in the seat width direction, and a rear flange portion 11C bent from a rear edge portion of the general surface portion 11A so as to protrude inward in the seat width direction. Here, the front flange portion 11B and the rear flange portion 11C correspond to the "flange portion" of the disclosure, respectively.

Figure 4:
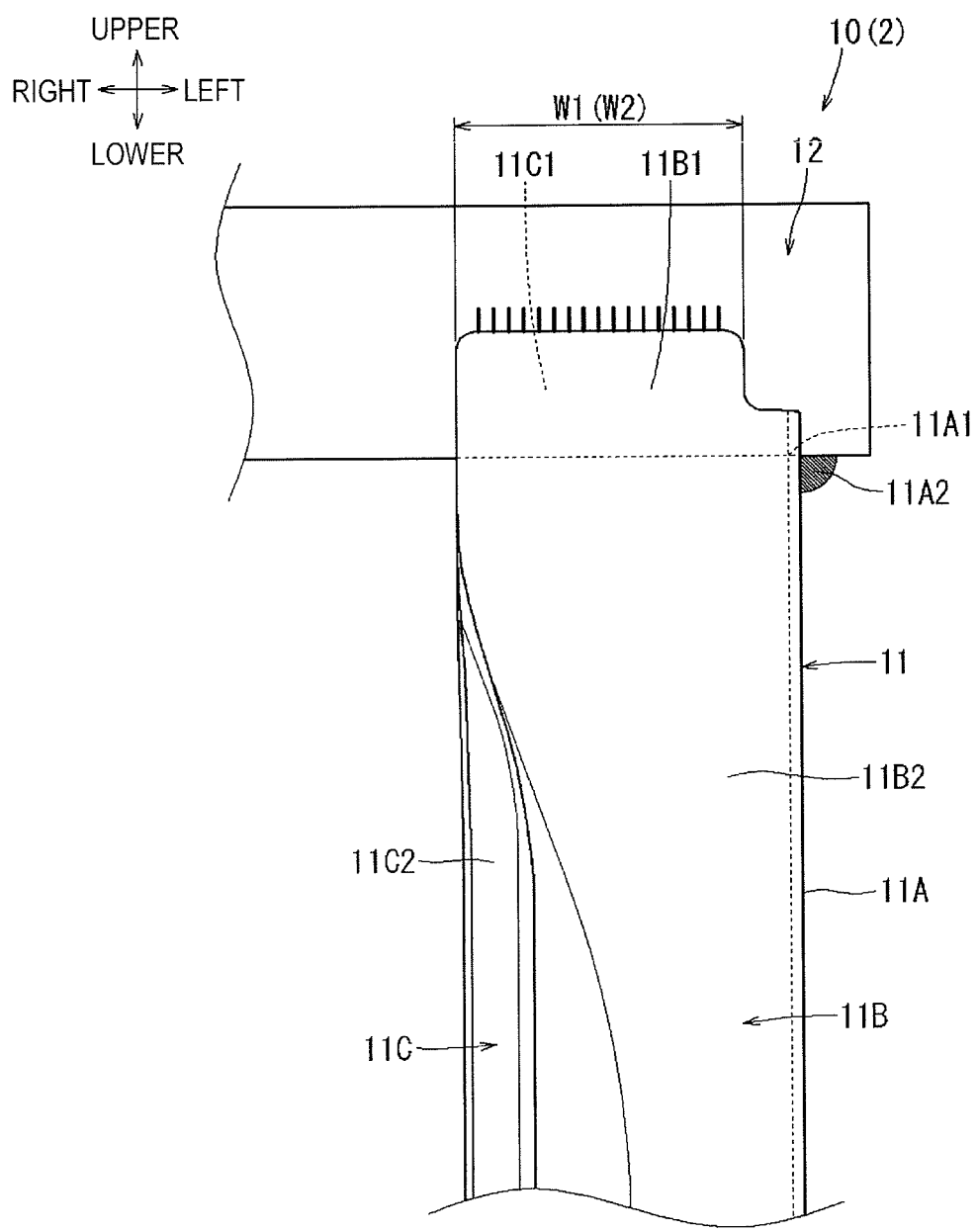
FIG. 4 is a front view of FIG. 2.
Figure 5:
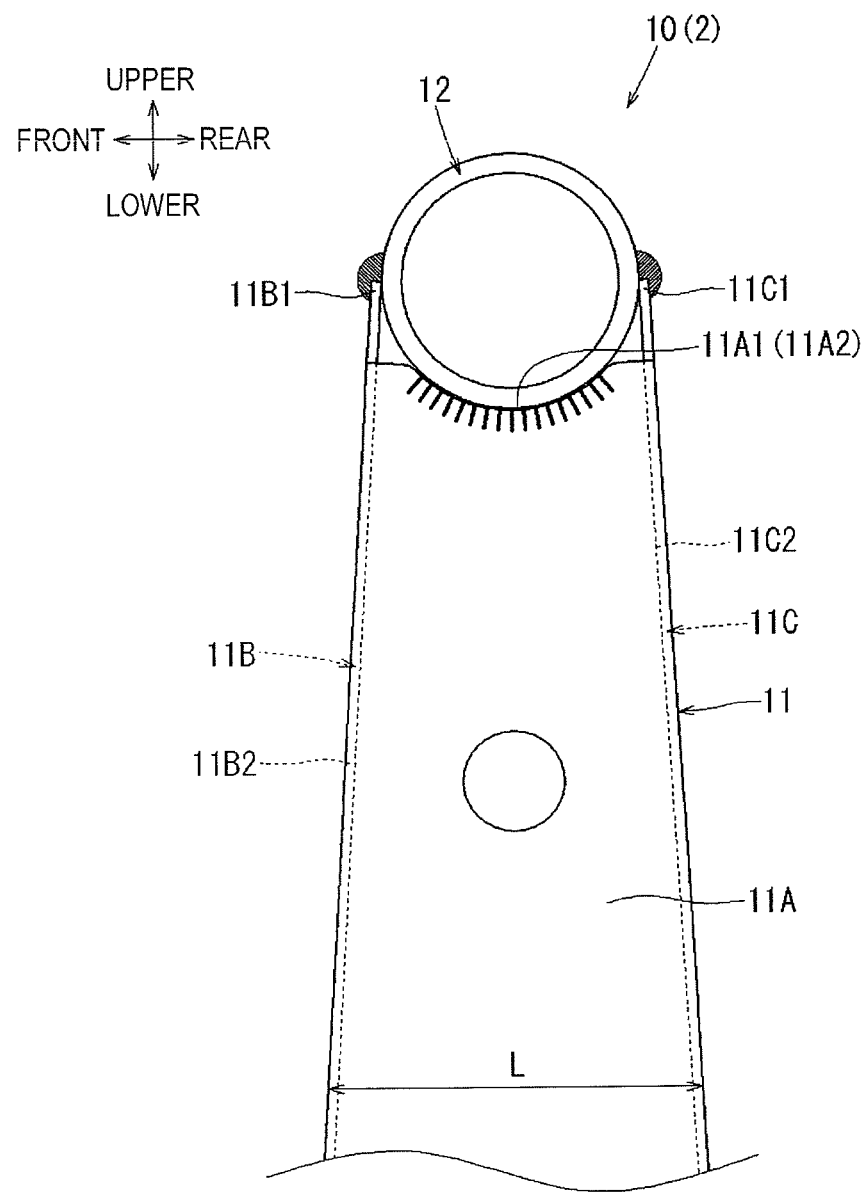
FIG. 5 is a side view of FIG. 2.

As shown in FIG. 1, the above-described general surface portion 11A is formed such that its width L in the seat front and rear direction is straightly narrowed in a tapered manner from a lower end side toward an upper end side. Further, as shown in FIGS. 3 and 5, a lower semicircular recessed portion 11A1 is formed in a shape of being hollowed out on an upper edge portion of the general surface portion 11A. A connection-side end portion of the above-described upper pipe 12 can be set in a state of being gently fitted on the recessed portion 11A1 from above. As the connection-side end portion of the upper pipe 12 is set on the inside of the recessed portion 11A1 from above, an inner peripheral surface of the recessed portion 11A1 curved in a lower semicircular shape comes into contact with an outer peripheral surface of a lower half of the upper pipe 12, so that the recessed portion 11A1 surrounds the lower half of the upper pipe 12 from the front and rear sides. Specifically, as shown in FIGS. 2, 4, 6 and 7, the recessed portion 11A is in a state of being in contact with the upper pipe 12 from below at a position slightly inward from an outer end of the upper pipe 12 in an axial direction thereof (seat width direction).

Figure 7:
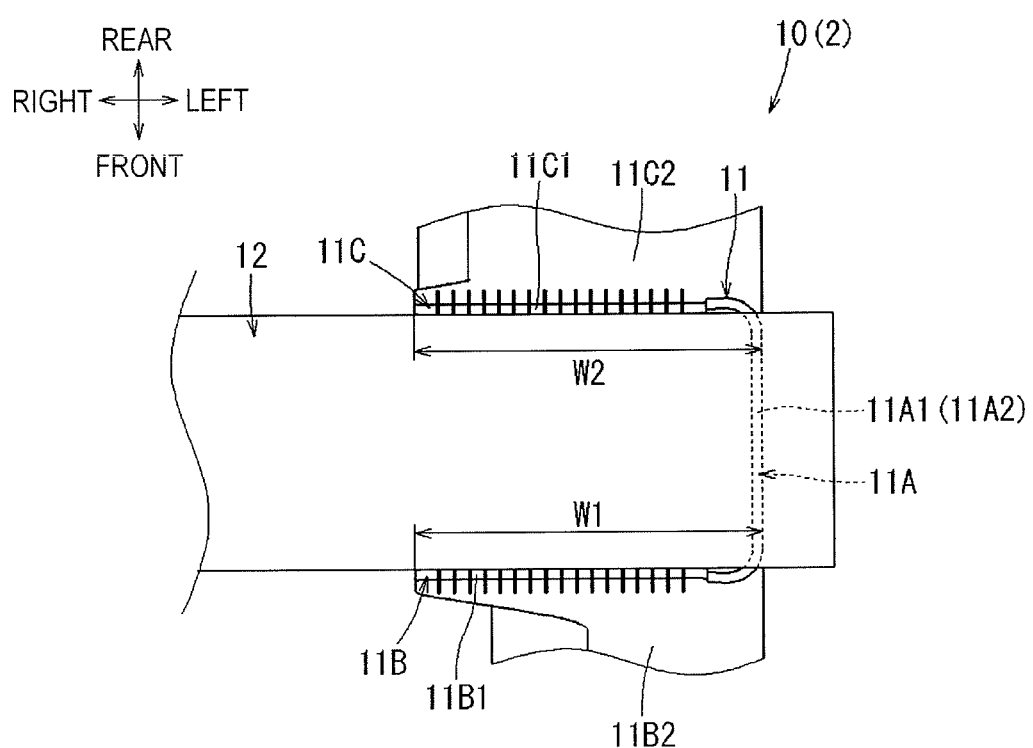
FIG. 7 is a plan view of FIG. 2.

Further, as shown in FIGS. 3, 5 and 7, as the lower half of the upper pipe 12 is set on the inside of the above-described recessed portion 11A1, an upper end portion of the front flange portion 11B and an upper end portion of the rear flange portion 11C protruding inward in the seat width direction from the respective front and rear edges of the above-described general surface portion 11A are also set in a state of coming into contact with the outer peripheral surface of the upper pipe 12 from the front and rear sides, respectively. Each of the side frames 11 is configured such that the upper end portion of the front flange portion 11B, the upper end portion of the rear flange portion 11C and the peripheral portion of the recessed portion 11A1, which are positioned in the state of being in contact with the outer peripheral surface of the upper pipe 12, are respectively welded to the outer peripheral surface of the upper pipe 12 by arc welding, thereby being firmly and integrally coupled thereto (welded portions 11A2, 11B1, 11C1).

As shown in FIG. 1, the front flange portion 11B and the rear flange portion 11C described above are respectively formed in a shape bent substantially perpendicularly from the respective front and rear edge portions of the above-described general surface portion 11A toward the inside in the seat width direction. Further, in the front flange portion 11B and the rear flange portion 11C, each edge portion bent inward in the seat width direction is further bent diagonally in the seat front and rear direction toward the side facing each other, thereby forming a shape bent twice. With this configuration, in each of the front flange portion 11B and the rear flange portion 11C, the respective edge portions on the front and rear sides of the side frame 11 and the respective edge portions thereof bent inward in the seat width direction are formed in a round shape without an edge.

Figure 6:
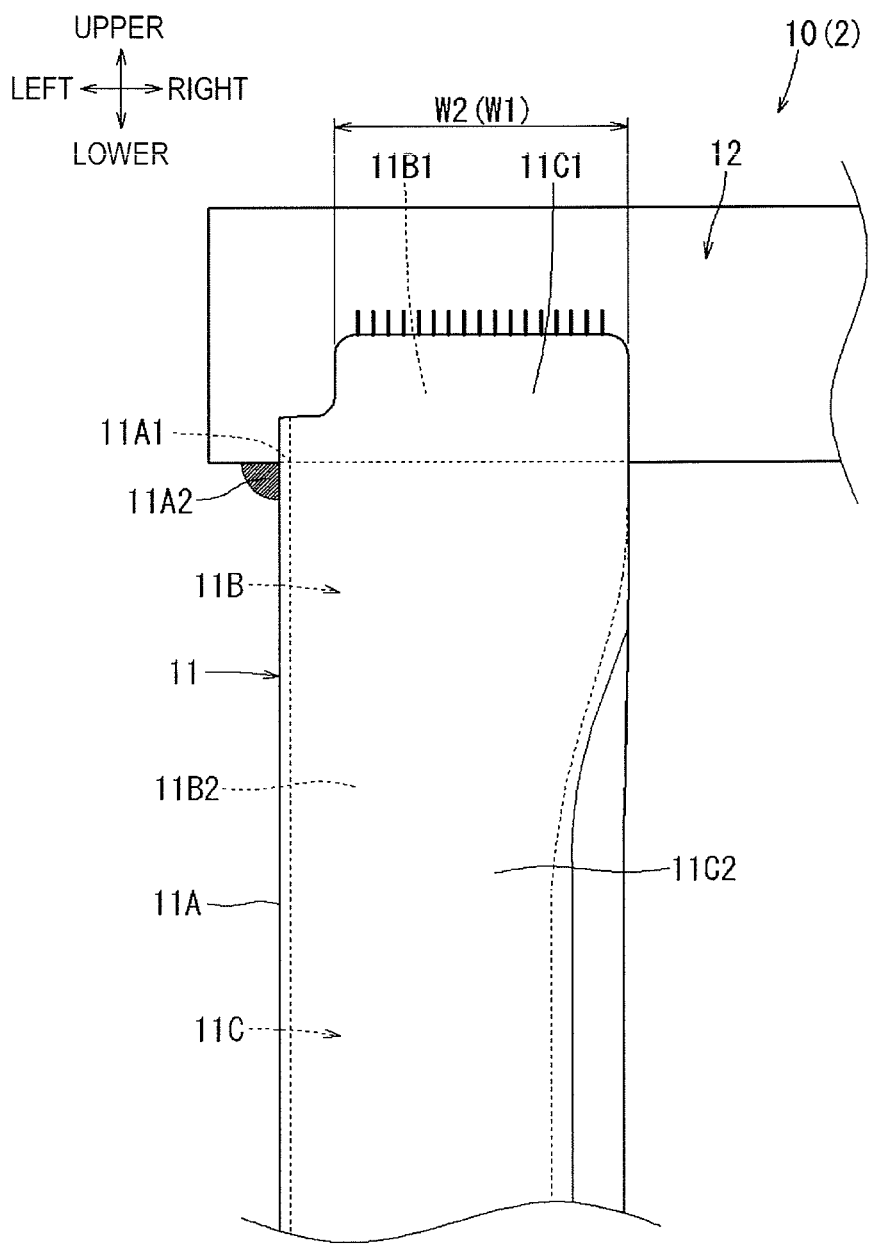
FIG. 6 is a rear view of FIG. 2.

Each of the front flange portion 11B and the rear flange portion 11C described above has a shape bent so as to protrude inward in the seat width direction over a wide range from an upper end edge to the vicinity of a lower end edge in the respective front and rear edge portions of the above-described general surface portion 11A. Specifically, as shown in FIGS. 3, 4 and 6, in the front flange portion 11B and the rear flange portion 11C described above, non-welded portions 11 B2, 11C2 located below the upper pipe 12 are configured such that the respective edge portions thereof bent inward in the seat width direction as described above are further bent diagonally in the seat front and rear direction toward the side facing each other, thereby forming a shape bent twice.

On the other hand, each of the welded portions 11B1, 11C1 on the upper end sides of the front flange portion 11B and the rear flange portion 11C, which overlaps with the upper pipe 12 in the seat front and rear direction and is welded to the upper pipe 12, has a flat shape that is bent once substantially perpendicularly from the above-described general surface portion 11A toward the inside in the seat width direction. With this configuration, each of the welded portions 11B1, 11C1 on the upper end sides of the front flange portion 11B and the rear flange portion 11C is formed such that each of lateral widths W1, W2 of the portions thereof protruding inward in the seat width direction is partially longer than that of each of the non-welded portions 11B2, 11C2 located below the welded portions.

With the above configuration, in each of the welded portions 11B1, 11C1, the welding length with respect to the upper pipe 12 is secured to be long in the seat width direction, and thus, the welding strength with respect to the upper pipe 12 is increased. In each of the welded portions 11B1, 11C1, the shape of the portion protruding inward in the seat width direction is partially elongated in the region overlapping with the upper pipe 12 in the seat front and rear direction and the vicinity of the region. Therefore, a foreign body feeling due to the protrusion is difficult to be transmitted to the seated occupant, so that the riding comfort is not disturbed. In each of the welded portions 11B1, 11C1, the protruding width is gently widened in an inclined manner from each of the non-welded portions 11B2, 11C2, and thus, stress concentration due to abrupt change in a sectional shape hardly occurs.

Further, each of the side frames 11 described above is welded to the upper pipe 12 in a state where the lower half of the upper pipe 12 is received by each of the recessed portions 11A1 formed at the upper end portions of the side frames 11. Thus, the abrupt change in the sectional shape of the portion to be connected to the upper pipe 12 hardly occurs, and thus, the stress concentration is hardly caused in the connected portions. As shown in FIG. 1, in the back frame 10 having the above configuration, each of the recliners 5 described above is connected to an outer surface portion on the lower end side of the general surface portion 11A of each side frame 11. The back frame 10 is connected, via these recliners 5, to inner surface portions of respective reclining plate 3A coupled to rear end positions on both left and right sides of the seat cushion 3.

To summarize the above, the back frame 10 of the present embodiment has the following configurations. That is, the seat back frame (back frame 10) forming a framework along an outer peripheral portion of the seat back (seat back 2) includes the upper frame (upper pipe 12) forming an upper framework of the seat back (seat back 2) and extending in the seat width direction and the side frame (side frame 11) forming a side framework of the seat back (seat back 2) and extending in the seat height direction. The upper end of the side frame (side frame 11) extends in the seat height direction up to the portion of the upper frame (upper pipe 12) extending in the seat width direction. The side frame (side frame 11) includes the general surface portion (general surface portion 11A) which is in contact with the upper fame (upper pipe 12) from below with its surface facing the seat width direction, and the flange portion (front flange portion 11B and rear flange portion 11C) which protrudes from the general surface portion (general surface portion 11A) with its surface facing the seat front and rear direction, is in contact with the upper frame (upper pipe 12) from at least one of the front and rear sides, and is welded to the upper frame (upper pipe 12).

In this way, since the side frame (side frame 11) is in contact with the upper frame (upper pipe 12) from below and is welded to the upper frame (upper pipe 12), the portions of the side frame (side frame 11) and the upper frame (upper pipe 12), which extend in the same direction, do not overlap with each other. Therefore, the side frame (side frame 11) and the upper frame (upper pipe 12) can be assembled to each other with less overlap mount. Furthermore, the welding length with respect to the upper frame (upper pipe 12) can be made longer in the seat width direction by the flange portion (front flange portion 11B and rear flange portion 11C). With these configurations, it is possible to reduce the weight of a joint structure between both frames. Further, when such a structure is provided to the side frame (side frame 11) which forms the entire side framework of the seat back (seat back 2) by a single piece, it is possible to effectively reduce the weight of the entire seat back frame (back frame 10).

Further, the flange portion (front flange portion 11B and rear flange portion 11C) includes the welded portion (welded portions 11B1, 11C1) which overlaps with the upper frame (upper pipe 12) in the seat front and rear direction and is welded to the upper frame (upper pipe 12) and a non-welded portion (non-welded portions 11C2, 11C2) which extends downward from the welded portion (welded portions 11B1, 11C1) and does not overlap with the upper frame (upper pipe 12) in the seat front and rear direction, and the width (lateral width W1, W2) of the welded portion (welded portions 11B1, 11C1) is wider than the width of the non-welded portion (non-welded portions 11C2, 11C2). In this way, the shape of the flange portion (front flange portion 11B and rear flange portion 11C), which is welded to the upper frame (upper pipe 12), is formed to partially protrude at the welded portion (welded portions 11B1, 11C1) welded to the upper frame (upper pipe 12). Therefore, it is possible to effectively increase the joining strength between both frames without accompanying a large increase in weight.

Further, a portion of the general surface portion (general surface portion 11A), which is in contact with the upper frame (upper pipe 12) from below, includes the welded portion (welded portion 11A2) which is welded to the upper frame (upper pipe 12). With this configuration, it is possible to further effectively increase the joining strength and structural strength between the upper frame (upper pipe 12) and the side frame (side frame 11) without accompanying an increase in weight of both frames.

Further, a portion of the general surface portion (general surface portion 11A), which is in contact with the upper frame (upper pipe 12) from below, includes the recessed portion (recessed portion 11 A1) which receives the upper frame (upper pipe 12) so as to surround the upper frame (upper pipe 12) in the seat front and rear direction. With this configuration, the side frame (side frame 11) can be assembled to the upper frame (upper side 12) in a state of being more strongly supported from the front and rear sides.

Further, the flange portion (front flange portion 11B and rear flange portion 11C) includes the front welded portion (welded portion 11B1) and the rear welded portion (welded portion 11C1) which are in contact with the upper frame (upper pipe 12) from the front and rear sides, respectively, and are welded to the upper frame (upper pipe 12). With this configuration, the side frame (side frame 11) can be more firmly joined to the upper frame (upper pipe 12). Meanwhile, as in the present embodiment, in the configuration in which the bent portions (front flange portion 11B and rear flange portion 11C) for softening an edge are formed at the front and rear edge portions of the side frame (side frame 11), the flange portion can be easily and reasonably formed by using these configurations.

Other Embodiments

Although the embodiments of the disclosure have been described above by using one embodiment, the disclosure can be implemented in various forms other than the above embodiment. For example, the seat back frame of the disclosure may be applied to a horizontally elongated seat structure such as a so-called bench seat on which a plurality of person can sit side by side, or may be widely applied to a seat structure provided for various vehicles other than automobiles, such as trains, aircrafts or ships.

Further, the upper frame may be made of a member having a closed sectional shape different from a closed sectional shape of a circular pipe material, such as a square pipe material or a plate material, or a material having an opened sectional shape. Similarly, the side frame may be made of a member having a closed sectional shape different from a closed sectional shape of a plate material, such as a circular pipe material or a square pipe material, or a material having an opened sectional shape. The upper frame and the side frame may be made of other metallic materials such as aluminum or magnesium, other than iron.

Further, the flange portion, which protrudes from the general surface portion with its surface facing the seat front and rear direction, is in contact with the upper frame from the front side or the rear side, and is welded to the upper frame, may be formed such that only the portion in contact with the upper frame is cut in and raised from the general surface portion or is partially extended from the general surface portion. Further, the flange portion may be in contact with and welded to only one of the front side and the rear side of the upper frame or may be in contact with and welded to both sides of the upper frame. Further, the general surface portion need not necessarily be welded to the upper frame.

Further, the recessed portion, which is formed at the portion of the general surface portion which is in contact with the upper frame from below, need not necessarily have a shape along an outer peripheral surface of the lower half of the upper frame and may have a recessed shape such as a V shape or an angular U shape to come into partial contact with the upper frame at some places.

What is claimed is:

1. A seat back frame forming a framework along an outer peripheral portion of a seat back, the seat back frame comprising:
    an upper frame forming an upper framework of the seat back and extending in a seat width direction, wherein the upper frame has an outer peripheral surface; and
    a side frame forming a side framework of the seat back and extending in a seat height direction,
    wherein an upper end of the side frame extends in the seat height direction up to the outer peripheral surface of the upper frame extending in the seat width direction, and
    wherein the side frame includes:
        a main portion having a surface extending in the seat height direction that faces the seat width direction and having an upper end surface which is in contact with the outer peripheral surface of the upper fame from below, and
        a pair of flange portions that protrude from the main portion, with surfaces of the pair of flange portions facing each other in a seat front and rear direction, wherein the pair of flange portions is in contact with the outer peripheral surface of the upper frame from the front and rear sides of the upper frame, and is welded to the upper frame.

2. The seat back frame according to claim 1,
    wherein the pair of flange portions includes a welded portion which overlaps with the upper frame in the seat front and rear direction and is welded to the upper frame and a non-welded portion which extends downward from the welded portion and does not overlap with the upper frame in the seat front and rear direction, and
    wherein a width of the welded portion is wider than a width of the non-welded portion.

3. The seat back frame according to claim 1,
    wherein a portion of the upper end surface, which is in contact with the upper frame from below, includes a welded portion, which is welded to the upper frame.

4. The seat back frame according to claim 1,
    wherein the upper end surface, which is in contact with the upper frame from below, includes a recessed portion which receives the upper frame so as to partially surround the outer peripheral surface of the upper frame in the seat front and rear direction.

5. The seat back frame according to claim 1,
    wherein the pair of flange portions includes a front welded portion and a rear welded portion which are in contact with the upper frame from the front and rear sides, respectively, and are welded to the upper frame.

6. The seat back frame according to claim 1, wherein the upper frame comprises a pipe.

7. The seat back frame according to claim 6,
    wherein the pipe is a circular pipe.

8. The seat back frame according to claim 7,
    wherein the recessed portion has radius corresponding to a radius of the circular pipe.

9. The seat back frame according to claim 6,
    wherein the pipe is a square pipe.

10. The seat back frame according to claim 1,
    wherein a position where the main portion of the side frame is in contact with the upper frame is located inwardly from an outer end of the upper frame in the seat width direction.

11. A seat back frame forming a framework along an outer peripheral portion of a seat back, the seat back frame comprising:
    an upper frame forming an upper framework of the seat back and extending in a seat width direction, wherein the upper frame has an outer peripheral surface; and
    a side frame forming a side framework of the seat back and extending in a seat height direction,
    wherein an upper end of the side frame extends in the seat height direction up to the outer peripheral surface of the upper frame extending in the seat width direction, and
    wherein the side frame includes:
        a main portion having a surface extending in the seat height direction that faces the seat width direction and having an upper end surface which is in contact with the outer peripheral surface of the upper fame from below, and
        a flange portion that protrudes from the main portion, with a surface of the flange portion facing a seat front and rear direction, wherein the flange portion is in contact with the outer peripheral surface of the upper frame from at least one of the front and rear sides, and is welded to the upper frame,
    wherein the flange portion includes a welded portion which overlaps with the upper frame in the seat front and rear direction and is welded to the upper frame and a non-welded portion which extends downward from the welded portion and does not overlap with the upper frame in the seat front and rear direction, and
    wherein a width of the welded portion is wider than a width of the non-welded portion.

12. The seat back frame according to claim 11,
    wherein a portion of the upper end surface, which is in contact with the upper frame from below, includes a welded portion, which is welded to the upper frame.

13. The seat back frame according to claim 11,
    wherein the upper end surface, which is in contact with the upper frame from below, includes a recessed portion which receives the upper frame so as to partially surround the outer peripheral surface of the upper frame in the seat front and rear direction.

14. The seat back frame according to claim 11,
    wherein the flange portion includes a front welded portion and a rear welded portion which are in contact with the upper frame from the front and rear sides, respectively, and are welded to the upper frame.

15. The seat back frame according to claim 11, wherein the upper frame comprises a pipe.

16. The seat back frame according to claim 15,
    wherein the pipe is a circular pipe.

17. The seat back frame according to claim 16,
    wherein the recessed portion has radius corresponding to a radius of the circular pipe.

18. The seat back frame according to claim 15,
    wherein the pipe is a square pipe.

19. The seat back frame according to claim 11,
    wherein a position where the main portion of the side frame is in contact with the upper frame is located inwardly from an outer end of the upper frame in the seat width direction.

* * * * *